United States Patent [19]
Friedman et al.

[11] Patent Number: 4,748,502
[45] Date of Patent: May 31, 1988

[54] COMPUTER VISION SYSTEM BASED UPON SOLID STATE IMAGE SENSOR

[75] Inventors: Mark B. Friedman; Gary J. Kiliany, both of Pittsburgh, Pa.

[73] Assignee: Sentient Systems Technology, Inc., Pittsburgh, Pa.

[21] Appl. No.: 897,497

[22] Filed: Aug. 18, 1986

[51] Int. Cl.$^4$ .............................................. H04N 3/14
[52] U.S. Cl. .................................... 358/93; 358/106
[58] Field of Search ................. 358/106, 139, 163, 10, 358/209, 212, 213.11, 213.29, 213.31, 93; 382/8; 351/209–210

[56] References Cited

U.S. PATENT DOCUMENTS

| | | | |
|---|---|---|---|
| 4,379,308 | 4/1983 | Kosmowski et al. | 358/106 |
| 4,441,125 | 4/1984 | Parkinson | 358/213 |
| 4,454,541 | 6/1984 | Duschl | 358/106 |
| 4,454,545 | 6/1984 | Duschl | 358/106 |
| 4,575,751 | 3/1986 | Duschl | 358/106 |
| 4,605,960 | 8/1986 | Cohen | 358/106 |
| 4,625,237 | 11/1986 | Cohen | 358/106 |
| 4,639,775 | 1/1987 | Cohen et al. | 358/106 |
| 4,648,052 | 3/1987 | Friedman et al. | 358/93 |
| 4,675,736 | 6/1987 | Lehmer et al. | 358/93 |

FOREIGN PATENT DOCUMENTS 2102122A 1/1983 United Kingdom ................ 358/106

OTHER PUBLICATIONS

IS256 OptiRAM, Micron Technology, Inc.
Build the Micro D-Cam Solid-State Video Camera, *Byte* Magazine, Sep. 1983, vol. 8, No. 9, pp. 20–31.
Build the Micro D-Cam Solid-State Video Camera, *Byte* Magazine, Oct. 1983, vol. 8, No. 10, pp. 67–86.

*Primary Examiner*—Jin F. Ng
*Assistant Examiner*—Stephen Brinich
*Attorney, Agent, or Firm*—Webb, Burden, Robinson & Webb

[57] ABSTRACT

A system for computer vision in association with a computer comprises a solid state image sensor or optic ram, a lens, a clock circuit for sequentially addressing the image sensor, and an edge detect circuit for detecting edges in the output bit stream of the image sensor. The edge detect circuit generates an interrupt signal for application to the clock circuit to stop the clock from advancing the addresses and for application to the computer to signal it to read the column and row address currently generated by the clock circuit.

24 Claims, 8 Drawing Sheets

COMPUTER VISION SYSTEM BASED UPON SOLID STATE IMAGE SENSOR

BACKGROUND OF THE INVENTION

Computer vision systems are systems that analyze camera generated images and enable useful conclusions to be reached from that analysis. Such systems often comprise digitizing an analog image to produce a table of digital data. Thereafter, a digital computer processes the digital data, for example, to locate edges, recognize shapes, or to verify spatial relationships. Computer vision systems are in their infancy but some truly useful applications already exist. Eyetrackers are a splendid example of computer vision systems. An eyetracker is a device that measures the movements of the eye upon which the camera is trained. Specifically, an eyetracker detects the direction an eye is gazing. An eyetracker communication system allows a physically handicapped person to use eye gaze and movement to communicate. In our copending patent application Ser. No. 551,309 entitled "An Eyetracker Communication System" assigned to the same assignee as this application, a complete eyetracker communication system is disclosed. In that system a very high quality video camera was required to generate the image to be digitized. It had been hoped that the system would enable many seriouly handicapped individuals to lead a better life. Unfortunately, the size of the system and the expense of the components of the system were a serious drawback.

This application discloses and claims an eyetracker communication system that is miniature compared to the earlier system and substantially less expensive. It now appears that the earlier hopes can be realized. The video camera has been eliminated altogether. It has been replaced by a solid state image sensor. The eyetracker has been totally reorganized and revised to use the type and quality of data available from the image sensor. This patent application describes a specific and unique application of a solid state image sensor which is described, for example, in U.S. Pat. No. 4,441,125. Another application of a similar device is described in *Byte, The Small Systems Journal,* Volume 8, No. 9, pp. 20 et seq. and No. 10, pp. 64 et seq. (September and October 1983). The specific solid state image sensor that is used in the physical embodiment described in this patent application is detailed in the sales literature of Micron Technology, Inc., Bulletin IS256 1A effective 11-1-85.

SUMMARY OF THE INVENTION

This invention comprises a computer vision system in which the camera comprises a suitable lens, a solid state image sensor, and a unique hardware interface between the image sensor and the typical computer inputs comprising a data bus, an address bus and, possibly, interrupt and control buses. The system also comprises a program stored in main memory of the computer.

A solid state image sensor is analogous to a random access memory device. It comprises a two-dimensional array of light sensitive memory cells. The cells are arranged in rows and columns. Each cell is accessible for reading, writing and refreshing. By writing to a cell the initial signal value on the cell can be established. The signals held on the cells decay at a rate related to the intensity of the light thereon. In the usual situation each cell includes a capacitor that holds a charge that bleeds away at a rate depending upon the light intensity. The polarity of the charge may vary from device to device. In any event, the entire array may be charged and then allowed to "soak" under the light image that the lens causes to fall thereupon. ("Soak" simply means the cells are not being refreshed or read and thus the signals upon the cells are allowed to decay.) After the soak period the image sensor is read by accessing each cell and comparing the charge thereon to a threshold. The output for a cell that has not decayed to the threshold is a signal level, say 1, that is indicative of a darker area of the image and the output from a cell that has decayed below the threshold is a signal level, say 0, that is indicative of a lighter area on the image. If each cell in the array is sequentially accessed by row and column, the output of the image sensor during reading is a bit stream.

The hardware interface according to this invention generates row and column addressing signals for sequentially accessing the memory cells and processes the output bit stream to detect edges between darker and lighter areas of the image. A clock means generates the row address and column address signals automatically and normally without control or interference from the host computer after a read (read-modify-write) or refresh cycle has been initiated. The clock means is interruptible so that the current addresses can be frozen and buffers are provided for transferring the current addresses to the data bus of the host computer. The clock means is also provided with an input that enables the resumption of the read or refresh cycle after an interrupt. According to a preferred embodiment, row addresses can be loaded into the counter from the data bus of the host computer. This enables a read cycle to begin at any row. According to a preferred embodiment of this invention, the clock means can address interleaved sets of rows. In other words, the clock means can access only even rows or only odd rows or only every third row, etc. In this case, each set of rows can be treated as a different image sensor. According to a preferred embodiment, the clock means provides an end of frame signal at the end of any read or refresh cycle. This signal may be polled over the computer data bus or supplied as an interrupt to the computer.

The hardware interface according to this invention includes an edge detecting circuit for processsing the bit stream out of the image sensor when it is being read. The edge detector determines when the value of the current bit in the bit stream is different from the last bit. This event occurs when moving from a lighter to a darker area on the array or vice versa. The edge detector generates an interrupt signal that is supplied to the clock means to stop the clock and to the computer to enable transferring the current addresses to main memory. In this way, only the location of edges need be stored for later processing. Also, the edge detector preferably generates a "color" signal that is a digital signal indicative of the signal level of the current bit in the bit stream (i.e., just before the interrupt). For example, if in reading the image sensor the column address accesses a bit just following a lighter area, the "color" bit would be indicative of darker. In other words, the "color" bit indicates whether the edge is a brighter-to-darker or darker-to-brighter edge. The computer can read the "color" bit via its data bus.

The interface hardware further comprises a control means for causing the accessing of the image sensor in one of three modes comprising a "refresh" mode, a "read" mode and a "write" mode. (A "read-modifywrite" mode may be used in place of separate "read" and "write" modes since once a cell is read it is always restored to the condition indicative of darker.) The control means has a control register that can be written to and from the computer data bus. The "control" word in the control register determines the mode. In the refresh mode the cells are sequentially accessed and the signal values compared to the threshold. If the signal value has not decayed to the threshold the signal is restored to the initial signal level indicative of darker. Preferably, every cell or bit in a row is refreshed by reading any one cell in that row. Thus, refreshing can take place much faster than reading or writing an entire row. Writing and reading to the image sensor have already been described. The writing mode is simply writing all cells in a sequential manner and the reading mode is likewise reading all cells in a sequential manner. These two may be combined into a read-modify-write mode. Where the clock means accesses sets of rows, the interface hardware can treat each set of rows in a different mode. The control means must also generate an acknowledge signal to restart the clock means after an interrupt caused by detection of an edge. For this, the control means acts upon a write to the control register from the computer data bus.

The host computer is in communication with the clock means and control means as described above for programming the length of the soak times and for accessing the data in the row address and column address buffers so that the computer can build a table of addresses where edges are detected during a read cycle. Preferably, the computer has stored in main memory a task comprising an algorithm for changing the soak times and analyzing data to establish a desired grey level. The soak times might be continuously increased until the brightest spot on the array is detected, or the soak times might be continuously decreased until the darkest area on the array is detected.

According to one embodiment of this invention, the computer vision system is employed in an eyetracker. In this application, a board is provided which bears indicia that may be selected with the user's eyes. Mounted to the board is a light source and the image sensor of a computer vision system as desribed above. The lens is used to focus one of the user's eyes upon the image sensor.

The task stored in the main memory of the host computer interactively controls the interface hardware to build edge address tables and to analyze the tables to find the corneal reflection of the light source upon the user's eye. The procedure may require stepwise increasing the soak time of the image sensor until the brightest spot on the image is found. The task then controls the interface hardware to build and analyze tables to find the border between the pupil and the iris. The procedure may require stepwise decreasing the soak time of the image sensor until the border is found. When the pupil is found, the center is calculated and the vector from the center of the corneal reflection to the center of the pupil is established. Head position, that is, the position of the pupil within the field of view is also noted. The vector and head position are then correlated with the indicia on the board. In other words, the vector values are compared to sets of values each of which is indicative of the eye gazing at a selected indicia upon the board for a given head position. Preferably, one set of interleaved rows is used to detect the corneal reflection and another set of interleaved rows is used to detect the border of the pupil. Soak periods for each set may commence at the same time but be of different duration. Thus, one set may be soaking while the other is being read. In this way, the search for the corneal reflection and the pupil may be somewhat simultaneous. It should be understood that it takes much longer to find the pupil since much longer soak times are required for detecting darker grey levels. Once, the corneal reflection has been found, the intensity of the light source may be increased to shorten the soak time needed to detect the pupil. Also, since the pupil will surround the corneal reflection, once the corneal reflection is found the starting row of the read cycle may be established to reduce the amount of data read. It may not be necessary to continually adjust soak times after start-up since lighting conditions may remain constant.

BRIEF DESCRIPTION OF THE DRAWINGS

Further features of the invention will be described with reference to the drawings in which.

DETAILED DESCRIPTION OF THE INVENTION

Figure 1:
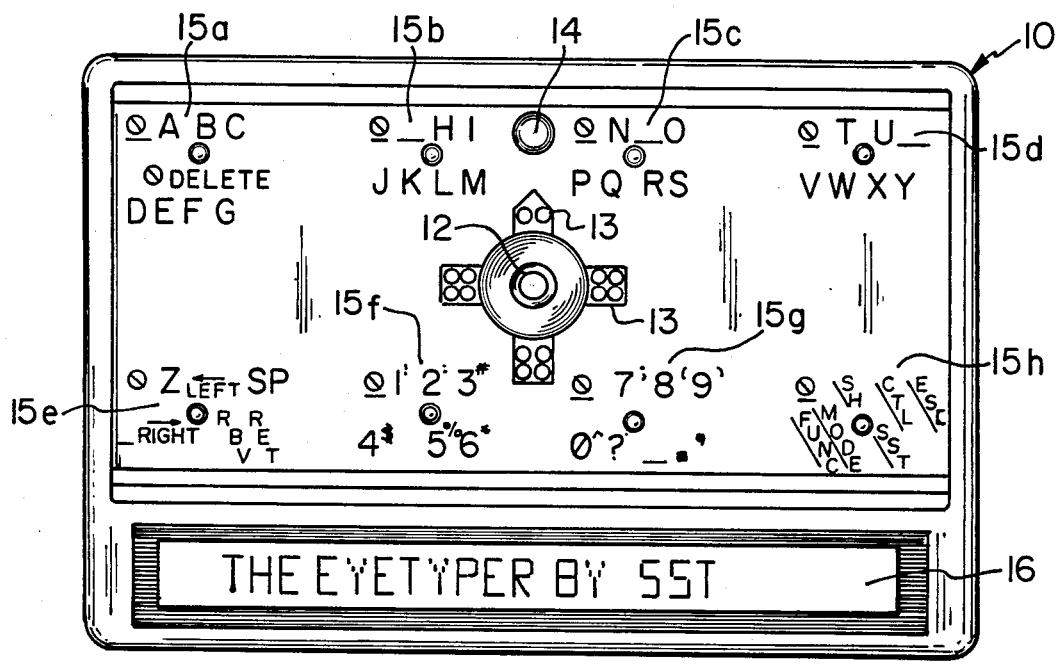
FIG. 1 is a perspective view of a "keyboard" used in one embodiment of an eyetracker communication system according to this invention.

Referring now to FIG. 1, there is shown in perspective the exterior of a computer vision system according to this invention. In particular, there is shown an eyetracker communication system. The entire system has been implemented to fit an 8 by 12 by 3 inch case 10 and to weight less than five pounds. The front of the case 11, referred to as the "board" or "keyboard", has mounted therein a lens 12 and a plurality of infrared lights 13 surrounding the lens. The lights are directed outward from the keyboard. A set-up light 14 is mounted at the top edge of the keyboard to direct a narrow visible beam of light perpendicular to the keyboard. The keyboard can then be easily positioned relative to the user by locating the beam spot on the middle of the forehead of the user approximately eleven inches away from the user's eyes.

The keyboard is provided with eight eye gaze positions (15a to 15h) with indicia of up to eight characters or functions located at each position. An acknowledge light may also be located at each position. In one mode of operation, a character or function may be established by the double gaze technique. In other words, the user gazes first at one of the positions containing the desired character or function. Then, the user gazes at the position on the keyboard which corresponds to the position of the indicia desired relative to the first position. For example, to select the character "A" the user would first gaze at the position 15a in the upper left-hand corner and then at the position 15b just to the right of the upper left-hand corner. As a further example, to select the character "G" the user would first gaze at the position 15a in the upper right-hand corner and then at the position 15h in the lower left-hand corner. The acknowledge lights simply indicate the location of the gaze. When the gaze has been held long enough to make a selection a tone is emitted.

A forty character display 16 is provided along the bottom of the keyboard to display characters that have been selected and words and sentences as they are assembled. The words or sentences may be dispatched to a printer, for example, with a character return. The possibilities are unlimited. The eyetyper may actually have associated work processing software for the case where the user desires to prepare a substantial amount of text. In the more usual and essential case of making possible the most basic of communication, the sentence may be dispatched to a speech synthesizer to actually speak the message.

In another mode of operation, the vision system is preprogrammed with short messages associated with each eye gaze position. These may be selected by a single gaze.

The means of detecting which position is being looked upon is the corneal reflection technique as further explained in our copending patent application identified above. Basically the system detects the position of the corneal reflection relative to the center of the pupil. The vector between the corneal reflection and the center of the pupil can be correlated to the position being gazed upon.

Prior eyetracking devices have made use of video cameras and in particular high quality video cameras. They have digitized an entire frame by use of a frame grabber circuit or as taught in our copending application have used a form of run length encoding to capture data from the frame without the need to record the digitized data for the entire frame. The use of video cameras was successful but expensive and awkward.

A device known as a solid state image sensor is available for directly capturing a digitized image. While the image sensor is inexpensive, it has a number of drawbacks that would discourage its use in many computer vision systems and certainly in an eyetracker communication system. The image sensor or optic ram as it is also called has a sentivity that is much lower than a video camera. The image is very affected by background lighting. The image sensor only provides a one bit digital signal for each pixel and grey levels are obtained by varying the "soak" time, i.e., the time following initializing that the image sensor is not being refreshed or read. The frame rate (rate at which data may be gathered by the image sensor and transferred to the computer) is very slow relative to video cameras and is especially slow when detecting thresholds between not so bright objects.

Applicants have invented certain techniques that overcome the drawbacks of the image sensor when used to obtain images, for example, to be used in an eyetracker communication system based on the corneal reflection technique.

The particular solid state image sensor used in the implementation of this invention is the IS256 manufactured by Micron Technology, Inc. Other image sensors that have similar inputs and outputs could also be used. For example, larger or smaller memory arrays or larger or smaller sensor arrays of other light integrating sensors may be used. The solid state image sensor is a dynamic ram (see U.S. Pat. No. 4,441,125). Each sensing element may be accessed (read from, written to, or refreshed). The address bits are multiplexed 9 bits at a time using RAS.lo (row address stobe active low) to latch the nine bits of row address and CAS.lo (column address strobe) to latch the nine bits of column address.

The IS256 solid state image sensor has several access modes which are determined by the WE.lo (write enable) input and the timing of the WE.lo pulse relative to the CAS.lo pulse.

The solid state image sensor has a normal read cycle in which the contents of every bit or cell in the row of an accessed bit is refreshed. Any bit that has decayed below the threshold is set to, say, zero volts and any bit that has not leaked to below the threshold is set to, say, five volts. The normal read is only used in the apparatus described herein to implement refresh of selected rows.

The solid state image sensor also has a read-modify-write mode in which the contents of every bit can be read and the bit read is reset to the signal on the Din terminal. This mode is used to read image data row by row and to initialize each row at the level indicative of dark. Since only one bit in each row needs to be read to refresh the row, the refresh of a row is many times faster than the reading of a row.

A drawback of existing image sensors is that the array of cells is not contiguous. There exist spaces between rows on the array (which may be filled with address and data leads) that are in a sense blind spots or blind areas. The portion of the image focussed by the lens upon the blind areas is lost. In fact, an entire eye image can fall within a blind area. To simply use one portion of the array between blind areas severely limits the field of view.

Figure 2:
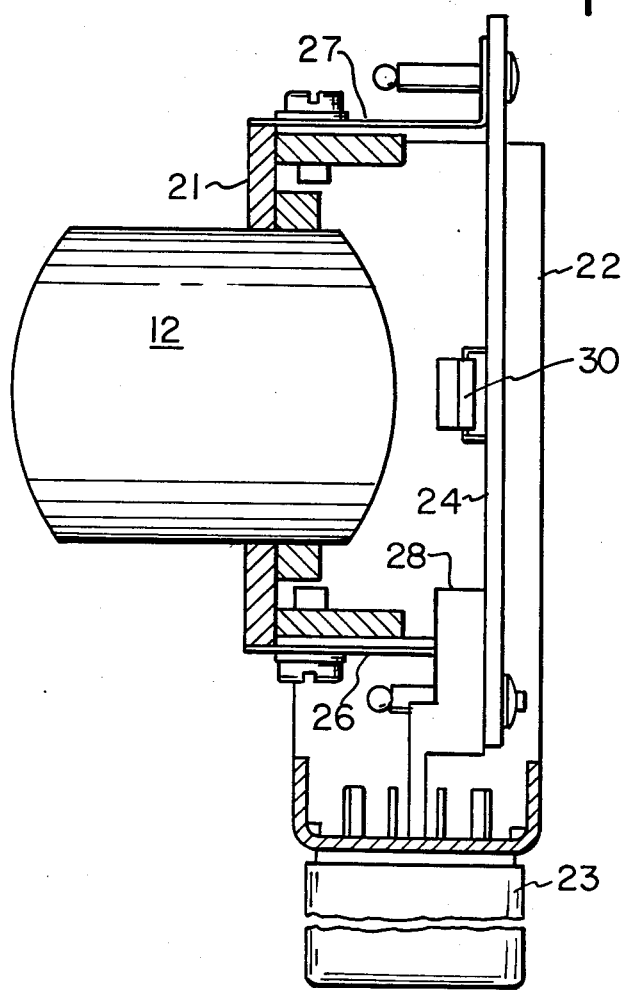
FIG. 2 is a side view of the mounting assembly showing the resilient mounting of the printed circuit board positioning the solid state image sensor behind the lens.

Referring now to FIG. 2, within the keyboard is a mounting assembly for securing a lens 12. The lens is held in place by a lens mount 21 which serves as the base structure of the assembly. The lens mount 21 is secured to the case of the keyboard (not shown). A relay mounting bracket 22 is fixed to the lens mount and supports an electromagnetic relay 23. A printer circuit board 24 has mounted to it, among other components, the optic ram or solid state image sensor 30. The printed circuit board is held relative to the lens mount 21 by resilient spacers 26 and 27. A push rod assembly 28 extends from the printed circuit board to the relay. Hence, when the relay is activated the printed circuit board and optic ram shift relative to the lens. The travel is accurately controlled to provide a 0.5 mm shift. The shift is used to move the optic ram so that the location of the blind areas on the optic ram can be changed.

Figure 3:
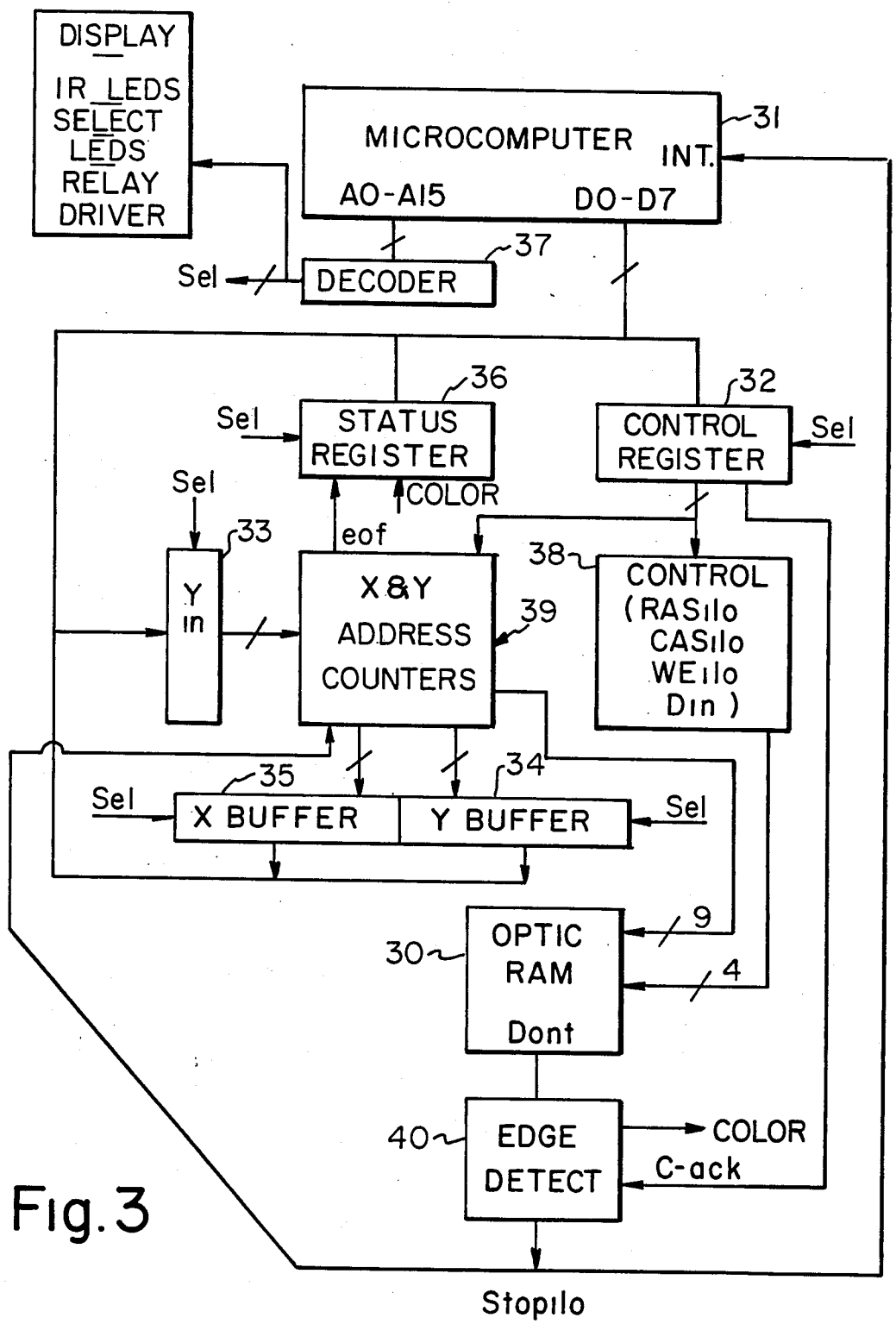
FIG. 3 is a block diagram of the digital and computer circuit of an eyetracker according to this invention.

Referring now to FIG. 3, the image sensor or optic ram 30 is part of an interface circuit that communicates with the computer 31 through the computer's data bus (D0-D7), address bus (A0-A15) and interrupt input (INT). The interface circuit includes five buffers for interface with the data bus. One is a control register 32 that holds a control word written from the computer. The control word establishes the mode (read, refresh, write) and the frame, i.e., whether to access even or odd rows. The five bit output of the control register may include the following digital signals: "read", "c-ack", "refresh", "zero", and "even/odd". The read and refresh signals are applied to the control circuit 38, the zero and even/odd signals to the clock circuit 39, and the c-ack signal is applied to the edge detect circuit 40 (to be described).

Another buffer which is used to transfer data to the interface circuit is the Yin buffer 33. This buffer is used to start a read cycle at other than the first row of a frame. Three buffers are read by the computer. One 34 holds the row address and another 35 the column address when an edge is detected in the output bit stream from the image sensor during a read cycle. The last buffer is a status register 36 that holds a status word. The status word has one bit that indicates "color" of the bit after an edge is detected, another that indicates end of frame (eof) after a read or refresh cycle and, possibly, a bit that indicates an edge has been detected. The address bus is decoded by a decode circuit 37 to select one of the five buffers with a decode select signal. The decode circuit is also used to select the display 16, lights 13, select lights (LED's) and a relay driver for activating the relay 23.

Figure 4:
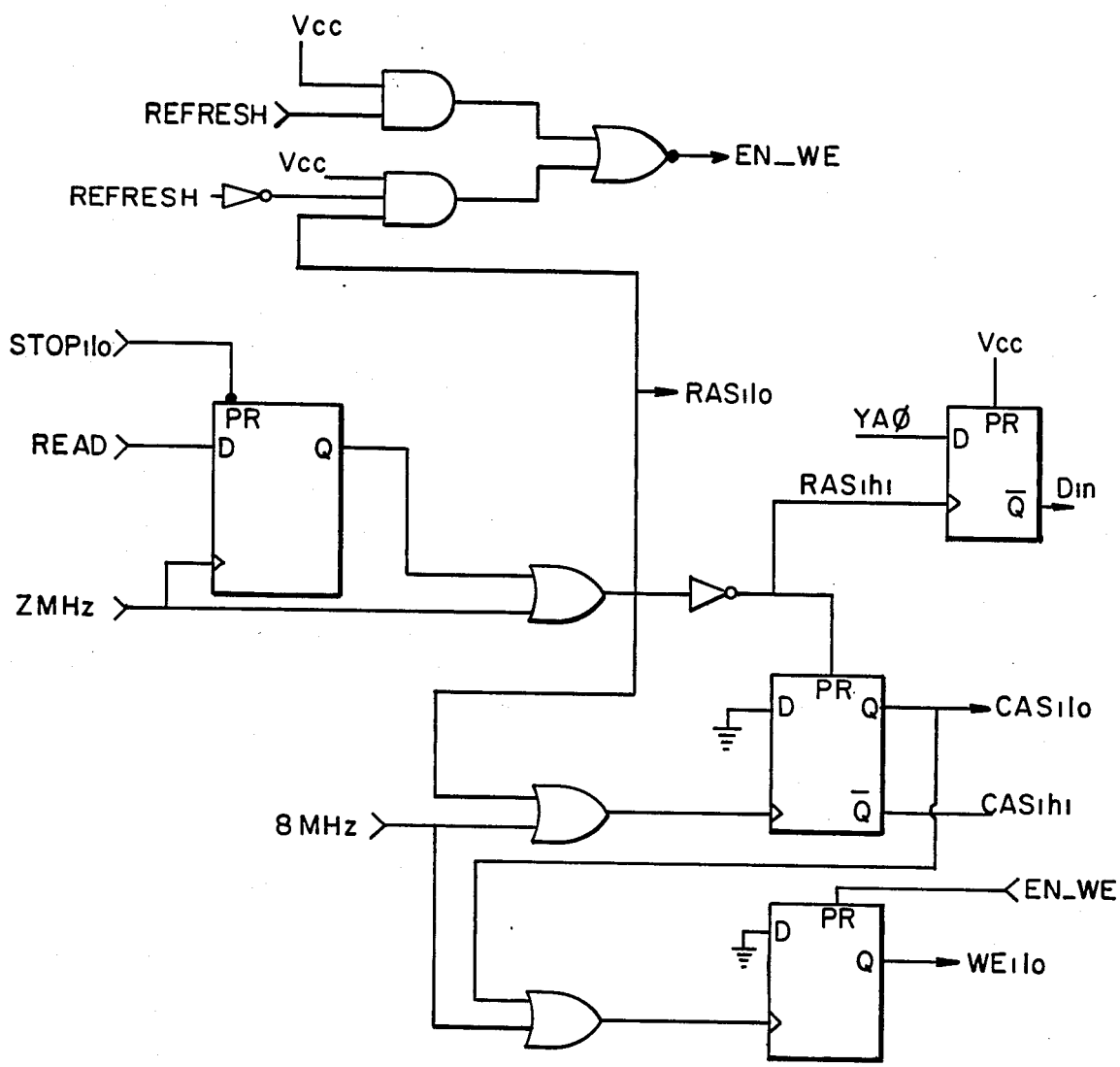
FIG. 4 is a circuit diagram of the Control Circuit shown as part of FIG. 3.

The control circuit 38 establishes the accessing mode by generating properly timed CAS.lo, RAS.lo, WE.lo and Din signals. Referring to FIG. 4, the inputs to the control circuit include an 8 Mhz and 2 Mhz clock signal, the read signal, the refresh signal, the stop.lo signal and YA$\phi$ signal.

Figure 5A:
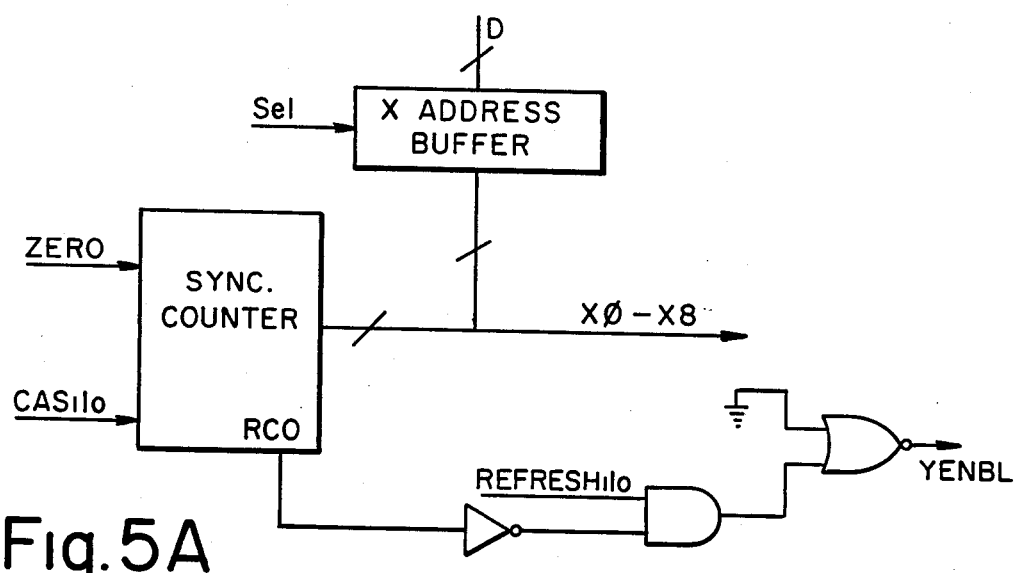
FIGS. 5A, 5B and 5C are circuit diagrams of portions of the Address Counters shown in FIG. 3.
Figure 5B:
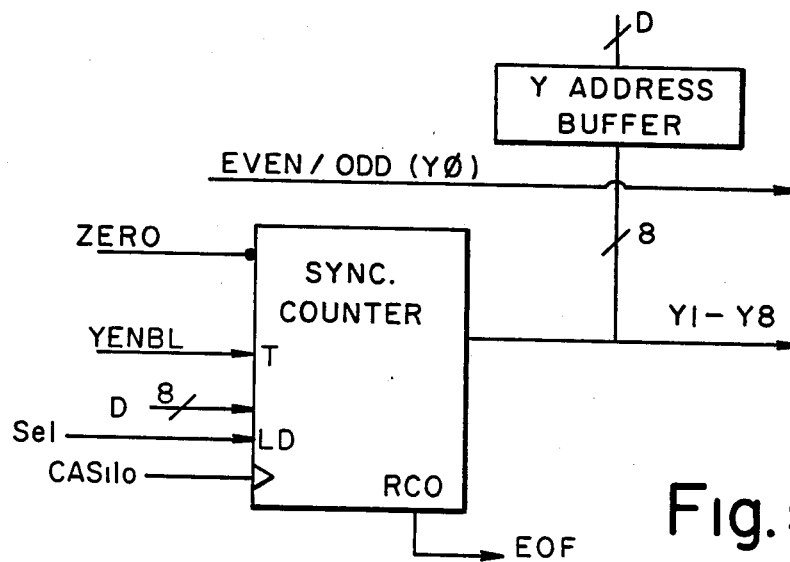
Figure 5C:
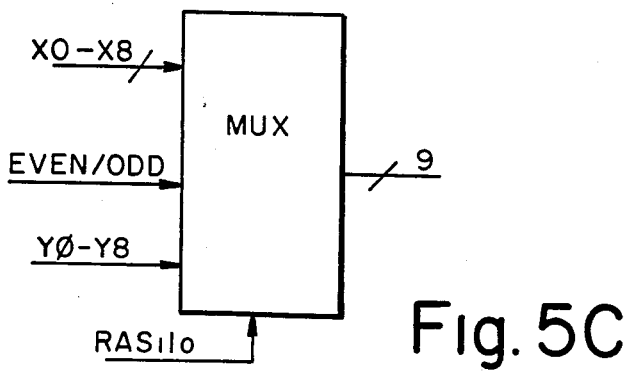

The clock circuit 39 establishes the addresses applied to the optic ram 30 during the CAS.lo and RAS.lo signals. Referring to FIGS. 5A, 5B, and 5C, the inputs to the clock circuit include the zero signal to zero all counters, the CAS.lo signal to increment the counters, the even/odd signal to select the frame, and the RAS.lo signal to multiplex the row and column address counts to the address input bus of the optic ram.

Figure 6:
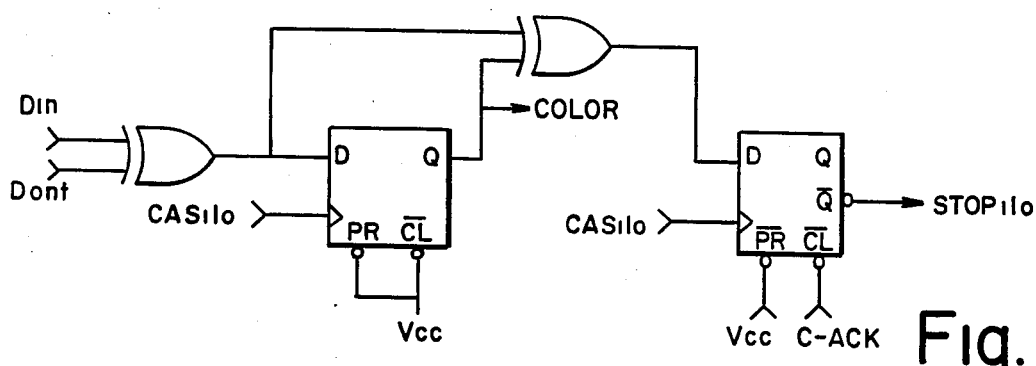
FIG. 6 is a circuit diagram of the Edge Detect circuit shown in FIG. 3.

The edge detect circuit 40 has as its input the stream of bits out of the optic ram during a read cycle and the c-ack signal. The outputs are the stop.lo and color signals. Referring to FIG. 6, then each bit in the stream is compared to the last bit and if a change in value is detected an edge has been passed. The outputs are a stop.lo signal to freeze the counters in the clock circuit and to interrupt the microcomputer to read the addresses of the edge that has been detected. An optional color bit may also be read by the computer at this time. Once the addresses have been read, the microcomputer writes to the control register to generate the c-ack acknowledge signal to restart the read cycle.

Figure 7:
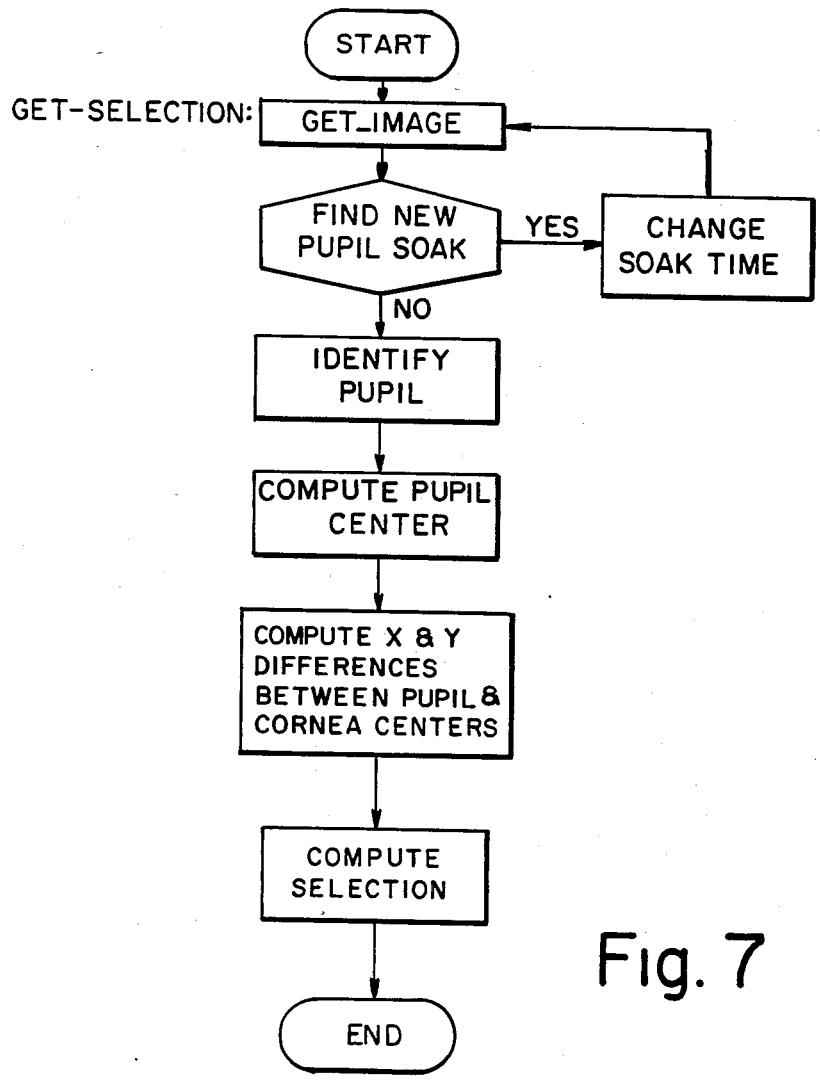
FIG. 7 is a flow diagram of the software routine get-selection.
Figure 8A:
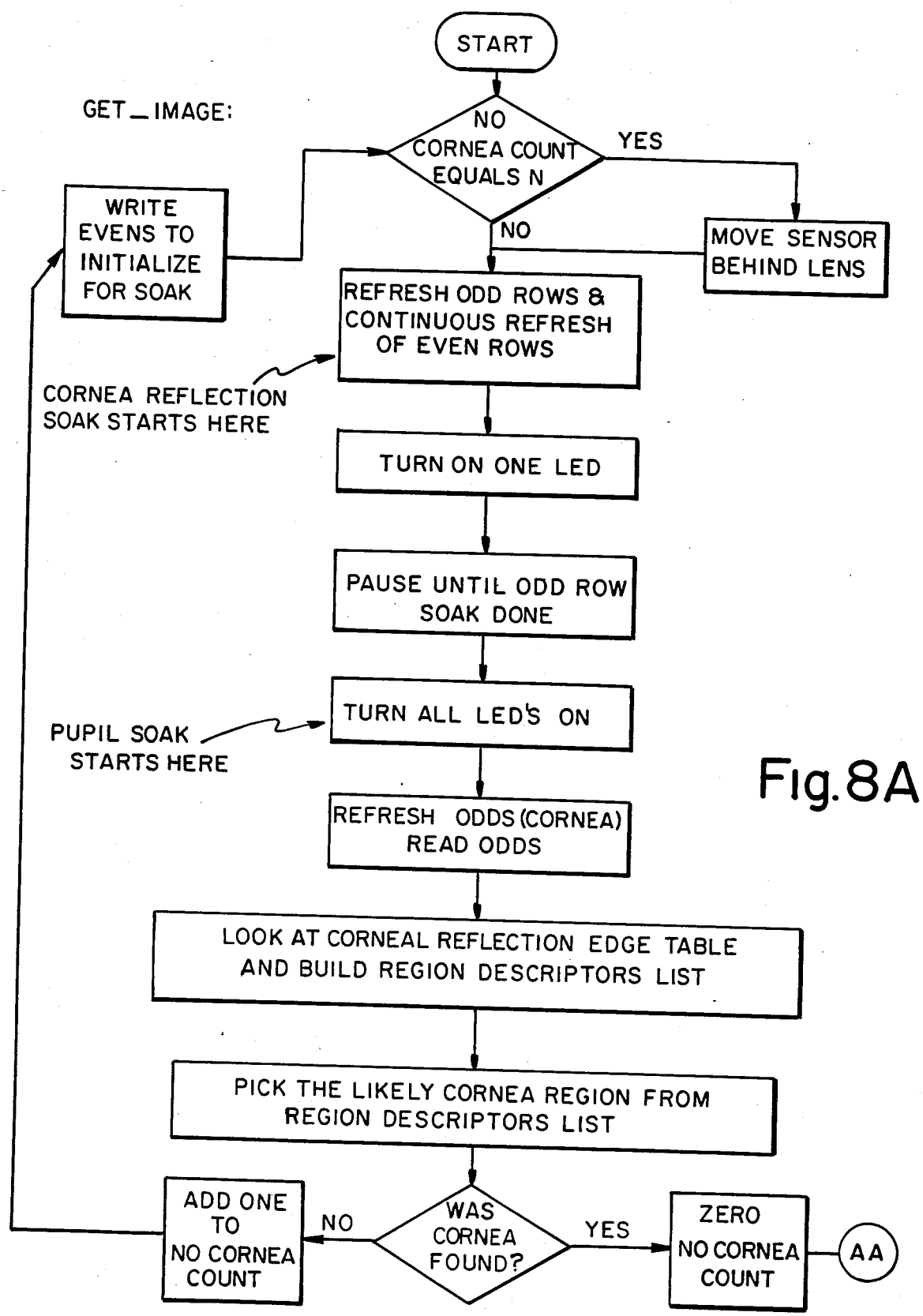
FIGS. 8A and 8B are flow diagrams of the software routine get-image.
Figure 8B:
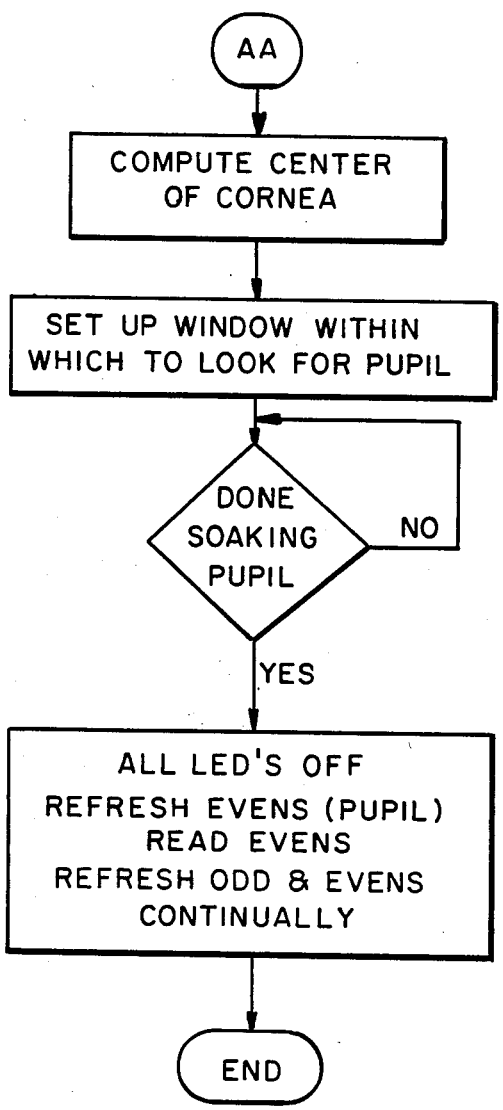

The software for implementing an eyetracker communication system is described with reference to FIGS. 7, 8A and 8B. The program get-selection begins (FIG. 7) by calling the subprogram get-image which returns with the center of the corneal reflection and an edge list that can be analyzed for the pupil. (Get-image is described hereafter.) If get-image cannot return the edge list, a different pupil soak time will be tried. The new soak time is set by a subroutine that adjusts the pupil soak time until a pupil edge list is returned which can be analyzed for a pupil. Get-selection next calls a subprogram identify-pupil that looks at the edge table, builds a region descriptor list which is a list of connected regions with size and location information. The region descriptor list is then analyzed for the region most likely to be the pupil considering size, shape and location to the corneal reflection. The program get-selection next computes the center of the pupil and then the x and y differences between the pupil and corneal reflection centers. Finally, the program computes a selection, that is, maps the x and y differences and head position to a selected character upon the keyboard. In other words, the vector is correlated with a selection made by gazing at a location on the keyboard.

The get-image subprogram (see FIGS. 8A and 8B) interacts directly with the image sensor. Get-image first determines whether an edge has been detected on a recent pass through get-image. If not, the image sensor is shifted behind the lens to change the location of the blind area on the image sensor. The rows used to detect the corneal reflection, say the odd rows, and the rows used to detect the pupil, say the even rows, are refreshed continuously to maintain the initialized condition. On a previous read-modify-write cycle both the odd and even rows will have been read and thus initialized. Now, the single or small cluster of infrared LED's are turned on below the lens. The odd rows soak for a preselected time. Then all LED's are turned on and the pupil soak begins. During the pupil soak the odd rows are refreshed and read. The program then analyzes the edge list created during the odd reads and builds a region description list and analyzes the list to select the corneal reflection, i.e., the brightest spot on the image.

Get-image then asks if it was successful in finding a corneal reflection and if not initializes the optic ram and attempts again to find the corneal reflection. By this time the user's head may have been properly positioned. If the corneal reflection is found the center is computed.

Preferably, according to this invention, the infrared LED's are turned on and off. It is easier to capture the corneal reflection if only one or a small cluster of LED's are on.

Figure 9:
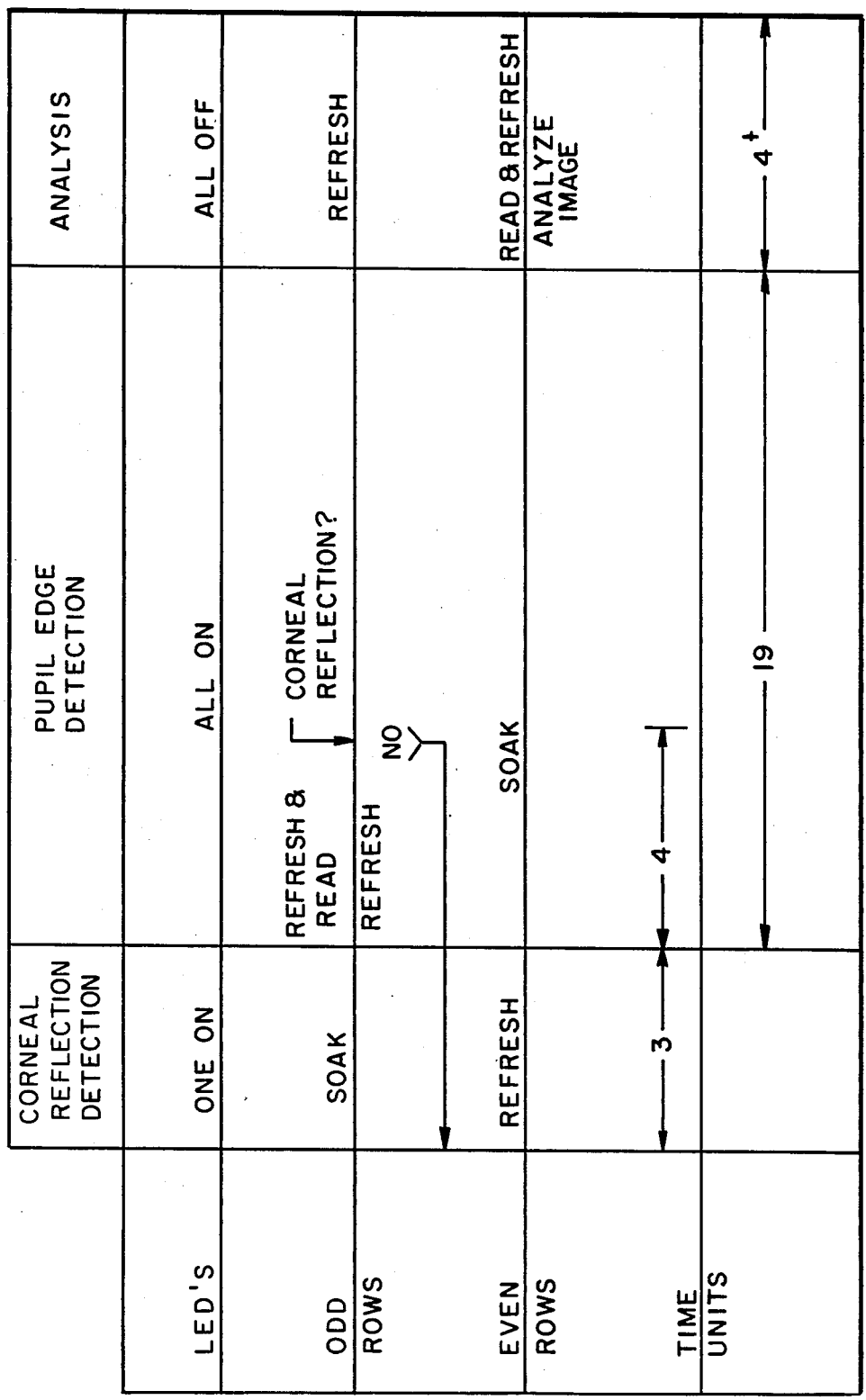
FIG. 9 is a timing diagram illustrating the operation of the eyetracker communication system in a preferred mode.

Referring now to FIG. 9, there is shown a chart illustrating the time periods during which corneal reflection and pupil edge data is collected and analyzed according to a specific scenario. Note first that experience has shown that three times units (16 mS per unit) are usually required for a soak to detect a corneal reflection. This period can be increased if the lighting so requires. Four time units or more are required to read either the odd or even rows of the optic ram. The number of edges detected will lengthen the time of the read cycle because the read is interrupted to transfer the edge address to computer memory. A read ignoring the data output to initialize the odd or even rows will only require four time units. A refresh of all odd rows or all even rows can take place in 128 microseconds and hence imposes no real time constraint. Typically, nineteen time units are required for soaking to detect the pupil edge even with the additional LED's turned upon the eye. A wide variation is seen depending upon the ambient lighting condition, but pupil soak time is usually four to eight times that for the cornea soak time. The period can be automatically increased or decreased to better detect the pupil.

Preferably, again to FIG. 7, one scheme for timing the LED's and overlapping the processing of even and odd rows of the optic ram is illustrated. During the corneal reflection soak period only the bottom LED's are turned on. The odd rows of the optic ram are soaked (not refreshed) for a period of about four time periods. At the end of this period they are refreshed and read. Starting at the end of the odd row soak, the even row soak begins (although it may have started at the same time as the even row soak). All LED's are turned on for this period. Simultaneously with the soak of the even rows, the odd rows are read and analyzed to determine if a corneal reflection has been found, i.e., if an eye is within the field of view of the lens. The subtask for determining whether a corneal reflection is present is called at the end of the read of the odd rows. If none is found the even rows must be initialized (e.g., by a read ignoring the data out) and soaked again with only one LED turned on. There are several reasons the corneal reflection may not be found. The eye may not be aligned with or close enough to the board. The image may fall on a blind area of the optic ram. (The latter problem can be automatically corrected with the applicants' invention by shifting the optic ram under the lens.)

After locating the corneal reflection, the window, i.e., the rows in which the pupil is likely to be located, is identified. These rows are those adjacent the corneal reflection. When the pupil soak times out, all LED's are turned off, the even rows are refreshed and the window is read. At this point the program identifies the pupil if it can and makes a correlation between the direction of the user's gaze and the characters on the keyboard. However, if the soak time for the pupil is not adequate for the detection of a pupil the soak time is adjusted and the entire process is restarted.

Numerous other scenarios for soaking, gathering and analyzing data are possible. For example, one very useful scenario involves overlapping the reading and analyzing of the corneal reflection data with the pupil soak and then reading and analyzing the pupil data during the cornea soak. Yet another scenario would be to gather multiple corneal reflections for every pupil. The most recently obtained pupil position is used with each corneal reflection position to computer the vector for mapping the gaze position.

The challenge with any eyetracker is to operate in real time. The computer must not be overloaded with calculations and the results of calculations must be timely. This problem may be addressed in a number of ways with this invention. First, the calculations for the corneal reflection may overlap the pupil soak. Next, the read cycle for pupil data can be shortened by use of windows, that is, reading only those rows in the vicinity of the corneal reflection. Of course, the remaining rows will have to be read to initialize them but this can take place simultaneously with the pupil calculations.

The specific embodiment described herein is of a stationary eyetracker apparatus before which the user is positioned. In another embodiment of this invention, the eyetracker will be mounted to the user's head, for example, by being mounted to an extension of the brim of a special hat or helmet.

The assembly source code for the program routines get-image and get-selection are as follows:

```
        . = image_processing.code_seg
start:
;
;       get_selection calls get_image, calls image analysis routines, computes the
;       x and y difference between the pupil and cornea centers, and calls the routine(s)
;       that map that x-y difference vector to a selection key. It returns with a selection
;       number (1 - 8).
;
get_selection:
gs_loop:
        lda timer_count
        cmp min_cycle_time
        bcc gs_loop
;
        jsr get_image    ; get_image returns with the cornea center and with the pupil
;                          information sitting in the edge list buffer.
        bbr7 search_flag, gs1
        rmb7 search_flag
        jsr get_threshold    ; SINCE GET_IMAGE WAS COMING OUT OF A SEARCH
;                              GO FIND THE PROPER PUPIL  THRESHOLD..
        bra gs_loop
;
;
;       NOW WE PICK_PUPIL_REGION AND ANALYZE THE TWO SPOTS
;
gs1:    lda #2
        sta connectivity_filter
        jsr gk_connectivity  ; build region descriptors
        jsr pick_pupil_region ;    pick which region we think is the pupil.
        bbs7 pick_region_status, gs.2
        inc no_eye_count     ;    make sure we found a pupil region.
        bra get_selection
;
```

```
gs.2:   smb7 pupil_center_status
        jsr compute_pupil_center       ; compute the center of the pupil.
        bbs7 pupil_center_status, gs.3
        inc no_eye_count
        bra get_selection
;
gs.3:   sec
        lda cornea_y_center
        sbc pupil_ycenter              ; y difference
        sta y_difference
;
        jsr compute_x_difference       ; find x center difference between cornea and pupil
;
;       check and make sure the differences are reasonable.
;
        lda x_difference
        cmp #$20
        bcs chk_hi.1
        bra chk_y
chk_hi.1:
        cmp #$E0
        bcs chk_y
        bra diff_bogus
chk_y:
        lda y_difference
        cmp #$10
        bcs chk_hi.2
        bra gs.1
chk_hi.2:
        cmp #$E0
        bcs gs.1                       ; y difference is bogus.
diff_bogus:
        inc no_eye_count
        bra get_selection
;
gs.1:
        stz no_eye_count
        lda latch_shadow
        and led1_shadow                ; since we have a good eye image,
        sta led1                       ;   make sure the user knows it.
        jsr lineup_light_off
;
        ldx x_difference
        ldy y_difference
        jsr compute_selection          ; map the x and y difference to a selection (1-8)
        rts
;       get_threshold attempts to find the optimal soak time for getting a clean picture
;       of the user's pupil.
;
        MAX_THRESHOLD = 18
        MIN_THRESHOLD = 9
;
get_threshold:
        lda latch_shadow
        and led1_shadow                ; since we have a good eye image,
        sta led1                       ;   make sure the user knows it.
        jsr lineup_light_off
;
        lda pupil_threshold
        clc
        adc #2
        sta pupil_threshold
        cmp #MAX_THRESHOLD+1
        bcc gtt
        lda #MAX_THRESHOLD
        sta pupil_threshold
gtt:    smb0 search_flag               ; indicate that this is the first threshold we are trying
gt_loop:
```

```
        lda timer_count
        cmp min_cycle_time
        bcc st_loop
        jsr get_image              ; take a picture of the eye with current_threshold setting.
;
        bbr7 search_flag, st2      ; IF get_image went into search mode THEN
        rmb7 search_flag
        lda #MAX_THRESHOLD
        sta pupil_threshold
        jmp set_threshold          ;     we have to start all over again.
;;;
st2:    lda latch_shadow
        and led1_shadow            ; since we have a good eye image,
        sta led1                   ; make sure the user knows it.
        jsr lineup_light_off
;;;;
        lda #2
        sta connectivity_filter
        jsr gk_connectivity        ; build the region descriptor list for this image.
;
;       jsr crlf
;       lda pupil_threshold
;       jsr puthex
;       jsr blank
;       lda num_regions
;       jsr puthex
;
        bbr0 search_flag, st3
        lda num_regions            ; if our first threshold try has zero regions continue
        beq st.1                   ;    normally.
        lda #MAX_THRESHOLD
        sta pupil_threshold        ; IF our first try had regions THEN restart from the
        bra st_loop                ;    highest threshold.
st3:    lda num_regions
        beq st.1
;
        stz R12                    ; holds maximum area lo
        stz R12 + 1    ;                       area hi
        lda #_lo(region_list.ram_seg)
        sta r7
        lda #_hi(region_list.ram_seg)
        sta r7+1
        lda num_regions
        sta temp1
st_max_loop:
        dec temp1                  ; find the region with the largest area.
        bmi st.2
        jsr plus_region_number
        ldy #hi_raw_area
        lda (r7), y
        cmp R12+1
        beq area_lo_comp
        bcs new_max_area
        bcc st_max_loop
area_lo_comp:
        ldy #lo_raw_area
        lda (r7), y
        cmp R12
        bcs new_max_area
        bcc st_max_loop
new_max_area:
        lda R7
        sta R5
        lda R7+1
        sta R5+1
        ldy #hi_raw_area
        lda (R7), y
        sta R12+1
```

```
        ldy  #lo_raw_area
        lda  (R7),y
        sta  R12
        bra  st_max_loop
;
st.2:
;       jsr  blank
;       ldy  #hi_raw_area      ; display area etc... out the serial port.
;       lda  (R5), y
;       jsr  puthex
;       ldy  #lo_raw_area
;       lda  (R5), y
;       jsr  puthex
;       jsr  blank
;       ldy  #min_y
;       lda  (R5), y
;       jsr  puthex
;       jsr  blank
;       ldy  #max_y
;       lda  (R5), y
;       jsr  puthex
;
        ldy  #hi_raw_area
        lda  (R5),y
        bne  set_thresh
        ldy  #lo_raw_area
        lda  (R5), y
        cmp  #$10
        bcs  set_thresh
        bra  st.1
;
set_thresh:
        dec  pupil_threshold
;
;;;     lda  pupil_threshold
;;;     jsr  puthex
;
        bra  st.3
;
st.1:   rmb0 search_flag       ; indicate we are done trying our first threshold.
        dec  pupil_threshold
        lda  pupil_threshold
        cmp  #MIN_THRESHOLD
        bcc  st.4
        jmp  st_loop
st.4:
;       lda  #'x
;       jsr  sendchr
        lda  #MAX_THRESHOLD-2
        sta  pupil_threshold
        jmp  set_threshold     ; if we go through all potential thresholds and
;                                don't find anything, then start all over.
;
st.3:
;       jsr  crlf
;       jmp  monitor.code_seg
        rts
;       get_image does amazing things.
;              Handles soaking and reading of even and odd rows of the IS256 image sensor
;       The cornea spot is imaged using the odd rows and the pupil is imaged using the
;       even rows. Get_image returns with the x and y center of the corneal reflection and
;       the pupil information sitting in the edge list.
;
pupil_soak_table:  .byte 4, 0, 3, 2
;
        WINDOW_Y_TOP_OFFSET = 25
        WINDOW_Y_BOTTOM_OFFSET = 50
        PUPIL_WINDOW_X_OFFSET = 20
```

```
set_image:
;;      jsr blank
;;      lda no_eye_count
;;      jsr puthex
;
        lda no_eye_count
        cmp #5
        bne si.2
        bbs7 search_flag, si.1  ; if we are not in search mode THEN move the relay.
        jsr move_relay
        bra si.1
;
si.2:   cmp #10
        bne si.s
        stz led1                ; turn selection lights ON if there hasn't been an eye in
;                                 front of the device for awhile.
        jsr lineup_light_on
        jsr move_relay          ; move relay if nothing in front of it for a long while.
        bra si.1
si.s:
        cmp #20
        bne si.set_srch
        jsr move_relay
        bra si.1
si.set_srch:
        cmp #21
        bne si.1
        smb7 search_flag        ; go into "power down" search mode.
        stz no_eye_count
;;;;;;
si.1:   lda #ODD
        sta even_or_odd
        jsr refresh_micron      ; refresh odds (cornea)
;
        lda #EVEN
        sta even_or_odd
        ora #refresh
        sta micron_control      ; put evens (pupil) back in continuous refresh mode.
;;;;
        jsr light_bottom_ired   ; turn only bottom ired on while we are looking for the cornea
        jsr start_image_timeline ; set timer count to zero. inc it every 16 mS.
;
si_wait_cornea:
        lda timer_count         ; wait until we are done soaking the cornea
        cmp #4  ;3?
        bcc si_wait_cornea
;xxx
        bbs7 search_flag, srch.1
        jsr all_ireds_on
        jsr start_image_timeline ; now we start soaking for the pupil using the
;                                  even rows.
        bra si.3
srch.1:
        jsr all_ireds_off
;xxxx
si.3:   lda #ODD
        sta even_or_odd
        jsr refresh_micron      ; refresh odds (cornea).
;
        lda #CORNEA
        sta pupil_or_cornea     ;   read odds for cornea info.
        stz read_y_start
        smb7 new_cornea_ref_flag ; xxxx???????xxxx?????
        jsr read_micron
;
        lda #ODD
        ora #refresh
        sta micron_control      ; put odds in continuous refresh mode.
```

```
;;;;
        bbr7 stop_reading, cornea_image_ok    ;IF buffer overflowed while reading
        jsr all_ireds_off
        jsr init_IS256                 ; cornea image, the image must be garbaged so
;                                        fill the IS256 with 1's and restart.
;;;     lda #'F
;;      jsr sendchr
        jmp get_image
;
cornea_image_ok:

;       NOW WE ANALYZE THE EDGE LOCATIONS THAT PRESUME TO CONTAIN A CORNEAL REFLECTION.
;
        lda #1
        sta connectivity_filter
        jsr gk_connectivity      ;    connectivity analysis. build region descriptors.
        jsr pick_cornea_region
        bbs7 pick_region_status, have_cornea   ; IF no cornea region then start over.
;
;xxxxx NO CORNEA       NO CORNEA       NO CORNEA xxxxxxxxxx
        bbr7 search_flag, nc.0
        inc no_eye_count         ; since we are in search mode, just need to
        jmp get_image            ;     increment counter and keep looking.
;
nc.0:   inc no_eye_count         ; counts how many times we haven't seen an eye.
        jsr all_ireds_off
        lda #EVEN
        sta even_or_odd
        jsr fill_with_ones       ; fill evens (pupil) with ones before we retart.
        jmp get_image
;xxxxxxxxxxxxxxxxxxxxxxxxxxxxxxxxxxxxxx
have_cornea:
        bbr7 search_flag, hc.0
;       rmb7 search_flag         ; we found a potential cornea so exit search mode.
        lda #EVEN
        sta even_or_odd
        jsr fill_with_ones       ; fill evens (pupil) with ones before we retart.
        jsr refresh_micron
        stz no_eye_count
;xxxxxx
        rts                      ; return indicating to get_selection we are exiting search mode
;       jmp get_image            ;    so it should do a get_threshold.
;xxxxxxxx
hc.0:   ldy #min_y
        lda (r6), y
        cmp ##78
        bcs chk_upper
        bra hc.1
chk_upper:
        cmp ##88                 ; since cornea reflection is near middle gap move the relay
        bcs hc.1
        bbs6 search_flag, m_gap_relay   ; prevent relay move oscillations if cornea on top
        jsr move_relay                   ; of middle gap.
        stz no_eye_count
        smb6 search_flag         ; indicate moving relay because of middle gap proximity
m_gap_relay:
        jsr all_ireds_off
        lda #EVEN
        sta even_or_odd
        jsr fill_with_ones       ; fill evens (pupil) with ones before we retart.
        inc no_eye_count
        jmp get_image
;;;;;xxxxxxxx
;       setup pupil soak compare, and pupil read y start
;
hc.1:
```

```
        rmb6 search_flag        ; indicate cornea not near middle gap.
;
        lda #_lo(pupil_soak_table)    ; set up pointer into pupil soak table.
        sta r12
        lda #_hi(pupil_soak_table)
        sta r12+1
        ldy #min_y
        lda (r6), y             ; minimum y value of cornea reflection.
        lsr a
        lsr a                   ; divide by 64 and use as index into pupil soak table.
        lsr a
        lsr a
        lsr a
        lsr a
        tay
        lda (r12), y            ; get the amount of time to soak from the table.
        clc
        adc pupil_threshold
        sta pupil_soak_time
;
        clc
        adc #5
        sta min_cycle_time      ; this is the minimum value that timer_count can be at
;                               before we start another get_image.
;;;;
        jsr compute_br_center   ; compute center of cornea reflection.
        lda br_xcenter          ;       bounding rectangle centers.
        sta cornea_x_center
; compute x center of cornea in 8bit global coordinates.
        jsr convert_cornea_x    ; add in 9 bit reference and divide by 2.
        sta cornea_8_xcenter
;
        lda br_ycenter
        sta cornea_y_center
;;;;;xxxxxxxxxxxxxxxx
;       NOW setup the window box within which we will look for the pupil.
;
        cmp #WINDOW_Y_TOP_OFFSET ; determine which row we should begin reading the pupil image
        bcc foo_ps1             ; we know the pupil is located close to the cornea so take
        sec                     ;       the cornea reflection's min y value and
        sbc #WINDOW_Y_TOP_OFFSET ;      subtract an offset.
        sta read_y_start
        bra setup_y_end
foo_ps1:
        stz read_y_start
setup_y_end:
        lda cornea_y_center
        cmp #$FF - WINDOW_Y_BOTTOM_OFFSET
        bcs foo_ps2
        clc
        adc #WINDOW_Y_BOTTOM_OFFSET
        sta window_yend
        bra setup_x_begin
foo_ps2:
        lda #$FF
        sta window_yend
setup_x_begin:
        lda cornea_8_xcenter    ; 8 bit global cornea x center.
        cmp #PUPIL_WINDOW_X_OFFSET
        bcc foo_ps3
        sec
        sbc #PUPIL_WINDOW_X_OFFSET
        sta window_xbegin
        jsr convert_8to9        ; set up pupil global 9 bit x reference.
        lda convert_lo
        sta pupil_xref_lo
        lda convert_hi
        sta pupil_xref_hi
        bra setup_x_end
foo_ps3:
        stz window_xbegin
        stz pupil_xref_lo
        stz pupil_xref_hi
```

```
setup_x_end:
        lda  cornea_8_xcenter
        cmp  #$FF - PUPIL_WINDOW_X_OFFSET
        bcs  foo_ps4
        clc
        adc  #PUPIL_WINDOW_X_OFFSET
        sta  window_xend
        bra  pupil_sk_loop
foo_ps4:
        lda  #$FF
        sta  window_xend
;;;;;;;
pupil_sk_loop:
        lda  timer_count
        cmp  pupil_soak_time   ; WAIT until pupil soak time is completed
        bcc  pupil_sk_loop
;
        jsr  all_ireds_off     ; turn ireds OFF
;
        lda  #EVEN
        sta  even_or_odd       ; refresh evens (pupil).
        jsr  refresh_micron
        lda  #PUPIL
        sta  pupil_or_cornea
        lda  #EVEN             ; read even rows ... pupil spot.
        sta  even_or_odd
        jsr  read_micron
;
        lda  #ODD
        sta  even_or_odd       ; refresh odds (cornea).
        jsr  refresh_micron
        lda  #EVEN
        sta  even_or_odd
        lda  #fill_ones        ;xxx put evens in continuous fill with ones mode  xxx
        ora  even_or_odd
        sta  micron_control
gi.end:
        rts
```

We claim:

1. A system for computer vision based upon a solid state image sensor used in association with a host computer comprising:

(a) a solid state image sensor analogous to a memory device, said sensor comprising a two-dimensional array of light sensitive memory cells arranged in a plurality of rows and columns, each cell being accessible for reading, refreshing, and writing to set each cell to an initial signal value, the signals on said cells decaying at a rate related to light intensity thereupon, the output upon reading any cell being a signal indicative of darker if the signal on the cell has not decayed to a preset threshold or a signal indicative of lighter if the signal at said cell has decayed to said threshold, (b) a lens for focussing a light image on said image sensor, (c) clock means for continuously generating column address signals and row address signal for each cell during sequential accessing of each cell, said clock means having row address and column address buffers that can be read to a computer data bus, and (d) edge detecting means for processing an output bit stream from said image sensor when each cell is being sequentially accessed for detecting a change in the value of the bits indicative of an edge between lighter and darker areas of the light image focussed on said array, said edge detecting means including means for generating an interrupt signal for application to the computer whereby the computer can read the column and row address of the edge by reading the column and row buffers.

2. A system according to claim 1 further comprising a control means for causing each row of said image sensor to be at one time in at least one of three modes comprising a "refresh mode" wherein the signal on each cell is continuously refreshed, a "read" mode wherein each cell is read by accessing in a substantially sequential manner with the output bit stream being passed to the edge detecting means and a "soak" mode wherein the signals on the cells are allowed to decay the "read" mode being selected for detecting edges and transferring row and column address signals to the computer, the "refresh" mode being selected for maintaining the signals on said cells, and the "soak" mode being selected for transferring the light image to the image sensor.

3. A system according to claim 2 wherein the control means includes means for in the refresh mode accessing one cell from each row to cause the refresh of the entire row and wherein the read mode each cell is restored to its initial signal value indicative of darker.

4. A system according to claim 1 wherein the clock means includes means for addressing the rows in interleaved sets such that each set can be treated as a different image sensor.

5. A system according to claim 2 wherein the clock means includes means for addressing the rows in interleaved sets such that the control means can place each set in a different mode than at least one other set.

6. A system as in any of claims 1 to 5 wherein the edge detecting means includes means for outputting a signal indicative of whether the last bit in the bit stream was indicative of a darker or lighter condition of the bit stream just after each edge detection.

7. A system according to claim 2 wherein the clock means includes means to restart in response to an acknowledge signal generated by the control means.

8. A system according to claim 2 wherein the clock means includes means for providing an end of frame signal when a refresh or read has been completed for selected rows in said array.

9. A system according to claim 1 or 2 further comprising means for presetting the row count in the clock means by writing a row address to the clock means for the computer data bus.

10. The system according to claim 1 wherein the clock means comprises means for interrupting the generation of address signals in response to an interrupt signal and wherein the interrupt signal generated by the edge detector is applied to the clock means.

11. A system for computer vision based upon a solid state image sensor used in association with a host computer comprising:

(a) a solid state image sensor analogous to a memory device, said sensor comprising a two-dimensional array of light sensitive memory cells arranged in a plurality of rows and columns, each cell being accessible for reading, refreshing, and writing to set each cell to an initial signal value, the signals on said cells decaying during soak times at a rate related to light intensity thereupon, the output upon reading any cell being a signal indicative of darker if the signal on the cell has not decayed to a present threshold or a signal indicative of lighter if the signal at said cell has decayed to said threshold, (b) a lens for focussing the light image on said image sensor, (c) clock means for continuously generating column address signals and row address signals for each cell during sequential accessing of each cell in each row, said clock means having row address and column address buffers that can be read to a computer data bus, (d) edge detecting means for processing an output bit stream from said image sensor when each cell is being sequentially accessed for detecting a change in the value of the bits indicative of an edge between lighter and darker areas of the light image focussed on said array, said edge detecting means including means for generating an interrupt signal for application to the clock means to stop the clock and for application to the computer whereby the computer can read the column and row address of the edge by reading the column and row buffers, and (e) a control means for causing each row of said image sensor to be at one time in at least one of three modes comprising a "refresh mode" wherein the signal on each cell is continuously refreshed, a "read" mode wherein each cell is read by accessing in a substantially sequential manner with the output bit stream being passed to the edge detecting means and a "soak" mode wherein the signals on the cells are allowed to decay, the "read" mode being selected for detecting edges and transferring row and column address signals to the computer, the "refresh" mode being selected for maintaining the signals on said cells, and the "soak" mode being selected for transferring the light image to the image sensor, and said host computer having a data and address bus, said computer being in communication with said clock means and control means at least via its data and address buses for programming the soak times and controlling the accessing of date in said row address and column address buffers and said host computer further having an associated main memory with a stored task for interactively controlling the clock and control means to enable the computer to read the data in said buffers and to build edge address tables in said memory and to interpret the data in said tables.

12. A system according to claim 11 wherein the main memory has a stored task for continuously changing the soak times and analyzing data in said tables until the desired soak times are achieved.

13. A system according to claim 12 wherein the main memory has a stored task for increasing the soak times between building tables in memory until the brightest spot on the array is detected.

14. A system according to claim 12 wherein the main memory has a stored task for decreasing the soak times between building tables in memory until the darkest area on the array is detected.

15. A system according to claim 11 wherein the clock means comprises means for addressing rows in interleaved sets and the control means can place each set in a different mode than at least one other set.

16. A system according to claim 15 wherein the main memory has a stored task for using the data from one interleaved set of rows only to detect the brightest spot on the array.

17. An eyetracker for detecting from the image of an eye focussed thereon the center of the pupil which is the darkest portion of the image and the center of the corneal reflection which is the brightest spot on the image comprising:

(a) a display bearing indicia which may be selected with the user's eyes, (b) a light source, (c) a solid state image sensor analogous to a memory device, said sensor comprising a two-dimensional array of light sensitive memory cells, (d) a lens for focussing a light image on said image sensor, (e) clock means for continuously generating column address signals and row address signals for each cell during sequential accessing of said memory cells, (f) a host computer having address and data buses, (g) edge detecting means for processing an output bit stream from said image sensor, said edge detecting means including means for generating an interrupt signal for application to the computer whereby the computer can read the column and row address of a detected edge, (h) a control means for causing each row of said image sensor to be in at lest a "read" mode or a "soak" mode, the length of time in the soak mode determining the signal level detected, the "read" mode being selected for detecting edges and transferring row and column address signals to the host computer and the "soak" mode being selected for transferring the light image to the image sensor, said host computer being in communication with said clock means and control means at least via its data and address buses for controlling the accessing of data from the image sensor, said host computer further having an associated main memory with a stored task for interactively controlling the clock and control means to enable the computer to read the row and column address signals to build edge address tables in said memory including a subtask for finding the corneal reflection of an eye upon which the image sensor which is the brightest spot on the array and having a subtask for finding the pupil by detecting the border between the pupil and the iris and having a subtask for finding the center of the corneal reflection and the center of the pupil and establishing the the distance and direction from center to center and having a task for correlating the distance and direction with the indicia upon the display.

18. An eyetracker according to claim 17 wherein the clock means includes means for addressing rows in interleaved sets such that each set can be in a different mode than at least one other set.

19. An eyetracker according to claim 18 wherein the control means and host computer include means for using one of said sets of rows to detect the corneal reflection and another of said interleaved sets to detect the pupil.

20. An eyetracker according to claim 17 wherein the control means and host computer include means for establishing the soak periods of different durations for each set such that one set is read while another is still soaking.

21. An eyetracker according to claim 17 wherein the clock means includes means for presetting the row count by writing a row address to the clock means from the computer whereby once the corneal reflection has been located only that portion of the array likely to contain the pupil image is read.

22. An image sensor according to claim 1 wherein the image sensor comprises more than one array, each array being spaced from the next thus establishing at least one blind area between arrays and further comprising means for mechanically shifting the solid state image sensor to alter the location of the blind area.

23. An eyetracker according to claim 17 further comprising means for controlling the intensity of the light source such that during the search for the pupil the light intensity is increased.

24. A system for computer vision based upon a solid state image sensor used in association with a host computer comprising:

(a) a solid state image sensor analogous to a memory device, said sensor comprising a two-dimensional array of light sensitive memory cells arranged in a plurality of rows and columns, each cell being accessible for reading and writing to set each cell to an initial signal value, the signals on said cells decaying at a rate related to light intensity thereupon, the output upon reading any cell being a signal indicative of darker if the signal on the cell has not decayed to a preset threshold or a signal indicative of lighter if the signals at said cell has decayed to said threshold, (b) a lens for focussing a light image on said image sensor, (c) clock means for continuously generating column address signals and row address signals for each cell during sequential accessing of each, said clock means having row address and column address buffers that can be read to a computer data bus, (d) edge detecting means for processing an output bit stream from said image sensor when each cell is being sequentially accessed for detecting a change in the value of the bits indicative of an edge between lighter and darker areas of the light image focussed on said array, said edge detecting means including means for generating an interrupt signal for application to the computer whereby the computer can read the column and row address of the edge by reading the column and row buffers, and (e) a control means for causing said image sensor to be in a "read" mode wherein each cell is being accessed in a substantially sequential manner with the output bit stream being passed to the edge detecting means or a "soak" mode wherein the signals on the cells are allowed to decay, the "read" mode being selected for transferring data to the computer and the "soak" mode being selected for transferring the light image to the image sensor.

* * * * *

UNITED STATES PATENT AND TRADEMARK OFFICE
CERTIFICATE OF CORRECTION

PATENT NO. : 4,748,502

DATED : May 31, 1988

INVENTOR(S) : Mark B. Friedman and Gary J. Kiliany

It is certified that error appears in the above-identified patent and that said Letters Patent is hereby corrected as shown below:

Column 1 Line 20 "movement" should read --movements--.

Column 5 Line 51 "sentivity" should read --sensitivity--.

Column 6 Line 46 "printer" should read --printed--.

Column 8 Line 22 "description" should read --descriptor--.

Column 10 Line 6 "computer" should read --compute--.

Claim 1 b) Column 23 Line 64 after "image" delete --comprising a "refresh mode" wherein the signal on each--.

Claim 2 Column 24 Line 64 after "modes" insert --comprising a "refresh mode" wherein the signal on each--.

Claim 9 Column 25 Line 38 "for" should read --from--.

Claim 11 e) Column 26 Line 32 "date" should read --data--.

Claim 17 h) Column 27 Line 18 "lest" should read --least--.

Signed and Sealed this

Seventh Day of February, 1989

Attest:

DONALD J. QUIGG

Attesting Officer

Commissioner of Patents and Trademarks